United States Patent [19]

Richardson

[11] Patent Number: 5,688,082
[45] Date of Patent: Nov. 18, 1997

[54] DUST EXTRACTOR

[76] Inventor: Owen Lewis Richardson, 10 Lentara Road, Bayview NSW 2104, Australia

[21] Appl. No.: 588,744

[22] Filed: Jan. 19, 1996

[30] Foreign Application Priority Data

Jan. 19, 1995 [AU] Australia .................. PN 0634
Apr. 10, 1995 [AU] Australia .................. PN 2213

[51] Int. Cl.$^6$ ...................................... B23B 45/00
[52] U.S. Cl. .................. 408/67; 408/113; 408/241 S; 409/137
[58] Field of Search ................ 408/67, 113, 241 S, 408/72 R; 409/137

[56] References Cited

U.S. PATENT DOCUMENTS

| | | | |
|---|---|---|---|
| 3,339,435 | 9/1967 | Heitz | 408/67 |
| 4,921,375 | 5/1990 | Famulari | 408/67 |
| 5,034,041 | 7/1991 | Austin | 408/67 X |
| 5,113,951 | 5/1992 | Houben et al. | 408/67 X |
| 5,292,210 | 3/1994 | Nowick | 408/67 |
| 5,467,835 | 11/1995 | Obermeier et al. | 408/67 X |

*Primary Examiner*—Daniel W. Howell
*Assistant Examiner*—Henry W. H. Tsai
*Attorney, Agent, or Firm*—Jerry Cohen

[57] ABSTRACT

A dust extraction housing for a rotary drill has a rear collar 10 which attaches to a stationary boss 14 of the drill and a concertina tube 18 extending forward to enclose the drill bit 22. A forward end piece 24 of the housing has an outlet 26 for attachment of a vacuum source and an air inlet 34 fitted with a removable filter 36.

9 Claims, 2 Drawing Sheets

DUST EXTRACTOR

BACKGROUND OF INVENTION

The present invention relates to a device for reducing the release of dust and other material into the surrounding area during drilling or like operations. In particular the invention relates to an enclosure for the rotary part of the drilling machine for confining particles to the vicinity of the hole being drilled and removal of the particles by a vacuum source.

Specifically, the invention relates to a dust extraction housing for a rotary drill, of the general type described in the Applicant's Australian Patent Application No. 64590/94, in which the housing includes a collar for removable attachment to a stationary part of the drill, a concertinaed enclosure extending forward from the collar and means for connection to a vacuum source. The present invention seeks to improve on that arrangement by providing, in addition, an air inlet means adapted for removable insertion of a filter member.

SUMMARY OF THE INVENTION

The present invention thus provides a dust extraction housing for a rotary tool, comprising a collar for removable attachment to a stationary part of the tool, a tubular enclosure extending forwardly of the collar for enclosing a rotary portion of the tool, the tubular enclosure being concertinaed to allow compression when the tool is moved forward to engage and penetrate a workpiece, means for connection of an external vacuum source for removing particles formed by action of the tool on the workpiece, air inlet means to allow ingress of air to said housing, and a filter replaceably fitted to said air inlet means.

BRIEF DESCRIPTION OF THE DRAWINGS

Further preferred embodiments will now be described with reference to the accompanying drawings, in which.

DETAILED DESCRIPTION OF THE PREFERRED EMBODIMENTS

Figure 1:
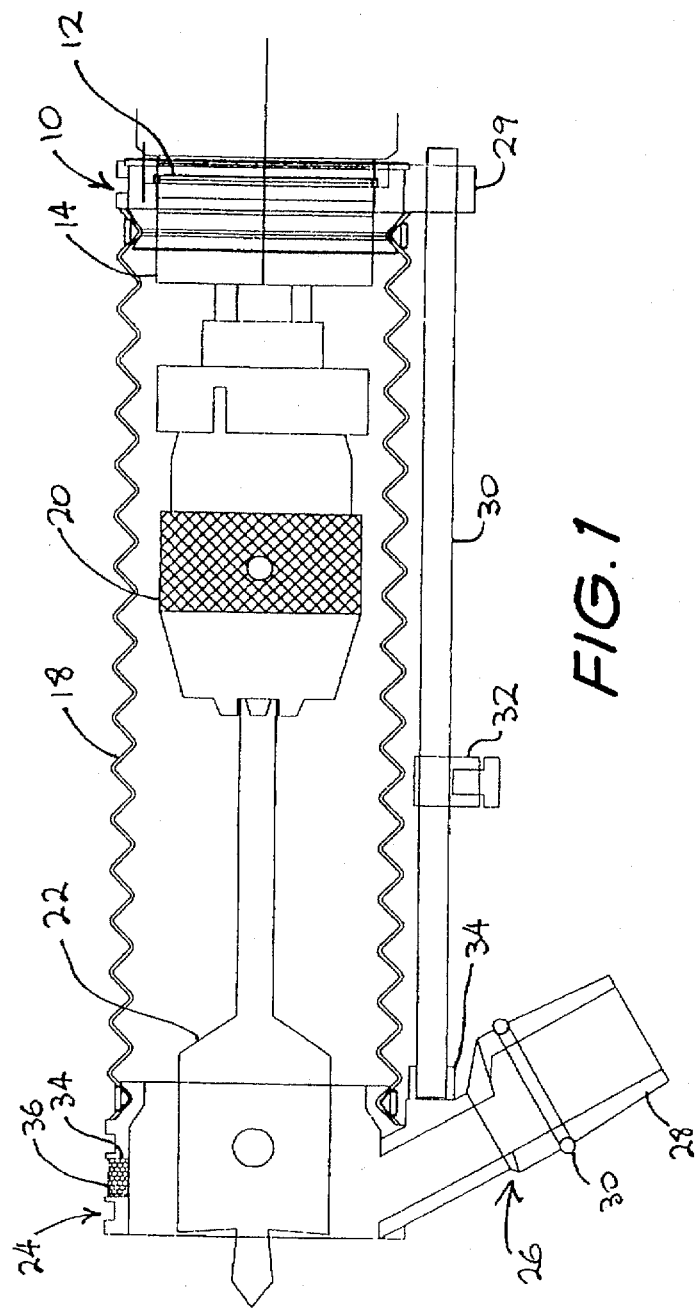
FIG. 1 is a schematic longitudinal cross-section along the centreline of the housing when expanded.
Figure 2:
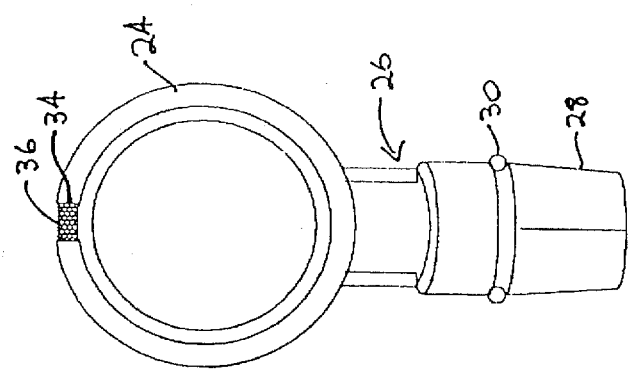
FIG. 2 is a view from the nozzle end of the housing.
Figure 3:
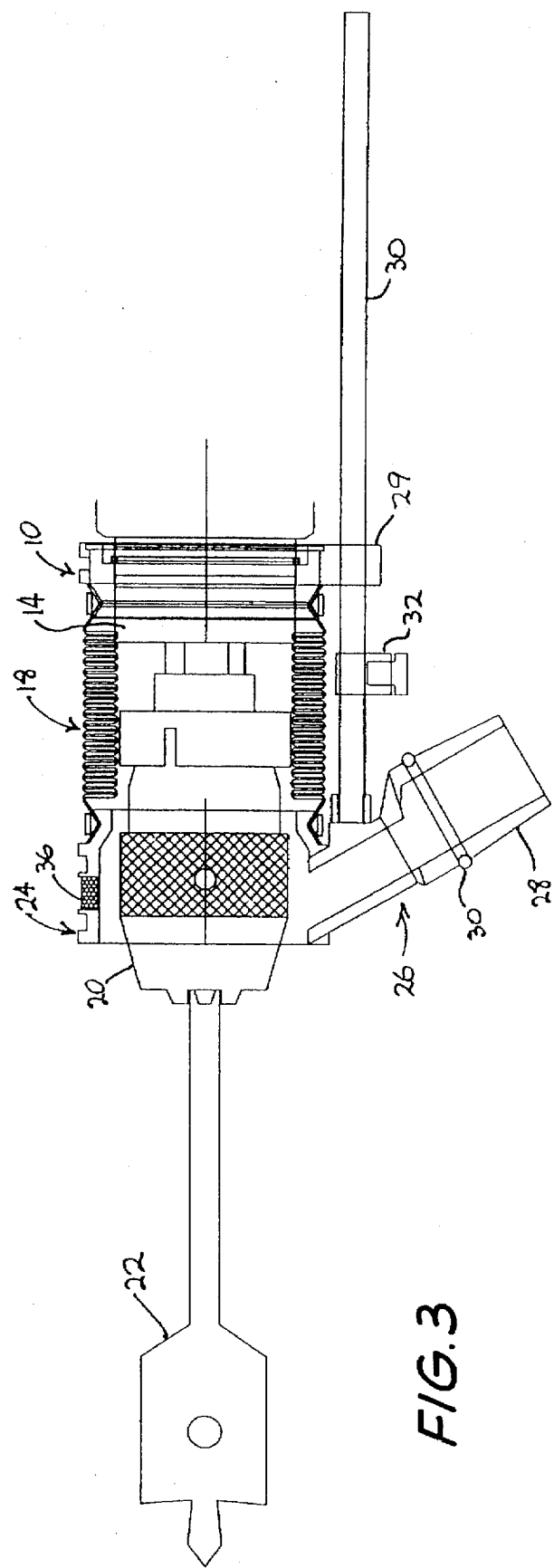
FIG. 3 is a schematic longitudinal cross-section when compressed.

The housing includes a rear collar 10 with a seal 12. The collar fits closely over the stationary boss 14 of a drill to secure the housing to the drill and act as a dust seal at the rear of the housing.

Extending forwardly of the collar, a flexible tube 18 is concertinaed to allow movement between its natural, substantially extended position and a compressed position. The tube has a diameter sufficient to clear the rotating spindle 20 of the drill and is sufficiently long when fully extended to cover the drill bit 22.

Attached to the forward end of the concertina tube is a generally cylindrical end piece 24. The end piece has an outlet tube 26 to which the external vacuum source is connected, for example via a flexible hose. The outlet tube has a tapered connection spigot 28 adapted at its end to connect to a small diameter (e.g. 25 mm) hose and having an o-ring 30 at its broader end to connect to a larger diameter (e.g. 32 mm) hose.

In use, the end piece contacts the workpiece in a circumference about the hole being drilled. This, together with the contact between the boss of the drill and the rear collar 10 of the housing, substantially prevents the escape of dust particles or other material from the enclosed space. The dust generated by drilling is removed through outlet tube 26 by the vacuum source and collected for safe disposal. In addition to safety benefits, the removal of the waste material from the area of the hole assists the operation of the drill by helping to prevent the drill from clogging up.

The resilient concertina tube 18 compresses as the drill is pushed forward to engage and penetrate the workpiece and returns substantially to its extended position when the drill is withdrawn.

The collar 10 carries a lug 29 for sliding attachment of rod 30 with a movable marker 32 for marking the desired depth of the hole. The forward end of the rod 24 is fixed to a lug 34 on the outlet tube 26, while the rear end extends through the lug 29 on the collar to allow the collar to slide longitudinally along the rod as the drill bit penetrates the workpiece. The distance which the collar travels along the rod, starting from the location of the collar on the rod when the drill bit first engages the workpiece surface, indicates the depth of the hole. As an alternative to marker 32, or in addition, the rod can have measurement markings.

The dust extraction housing is characterised by the provision of an air inlet aperture 34 which is adapted to receive a replaceable filter disc 36. By providing an inlet with a filter, a relatively large opening (compared to the size of the particles) may be used to enhance air flow through the housing for efficient removal of particles. The purpose of the filter is to serve as a barrier to the egress of fast moving particles counter-current to the inlet flow, which may otherwise be possible as the increased area of the relatively large inlet results in reduced inlet air velocity. The present arrangement thus combines efficient air flow and good precautions against the escape of dangerous particles.

The filter may simply consist of a disc of filter material which plugs inside the inlet aperture 34 and may be replaced by pushing out from the inside of the housing and inserting a new disc in the aperture.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein.

I claim:

1. A dust extraction housing for a rotary tool, comprising a collar for removable attachment to a stationary part of the tool, a tubular enclosure extending forwardly of the collar for enclosing a rotary portion of the tool, the tubular enclosure being concertinaed to allow compression when the tool is moved forward to engage and penetrate a workpiece, means for connection of an external vacuum source for removing particles formed by action of the tool on the workpiece, air inlet means to allow ingress of air to said housing, and a filter fitted to said air inlet means.

2. A dust extraction housing according to claim 1 wherein the air inlet means includes an aperture extending through a side wall of the housing, said filter plugging into engagement in said hole.

3. A dust extraction housing according to claim 1 wherein said means for connection of a vacuum source comprises an outlet tube located adjacent a forward end of the housing, said outlet tube supporting a forward end of a depth indicating rod extending generally parallel to the tubular enclosure.

4. A dust extraction housing according to claim 3 wherein said collar slidably supports said rod at position spaced rearwardly from said forward end of the rod.

5. A dust extraction housing according to claim 1 wherein said filter is replaceably fitted to said air inlet means.

6. A dust extraction housing according to claim 1 including an end piece at a forward end of said housing, said end piece including an outlet tube which comprises said means for connection of a vacuum source.

7. A dust extraction housing according to claim 6 wherein said outlet tube extends generally outwardly and rearwardly from said end piece.

8. A dust extraction housing according to claim 6 wherein said end piece includes a tapered outlet spigot.

9. A dust extraction housing according to claim 6 wherein said end piece also includes said air inlet means.

* * * * *